Jan. 10, 1961  A. F. DEAM  2,967,594
COLUMN AND BEAM CONNECTION
Original Filed Feb. 9, 1956  3 Sheets-Sheet 1
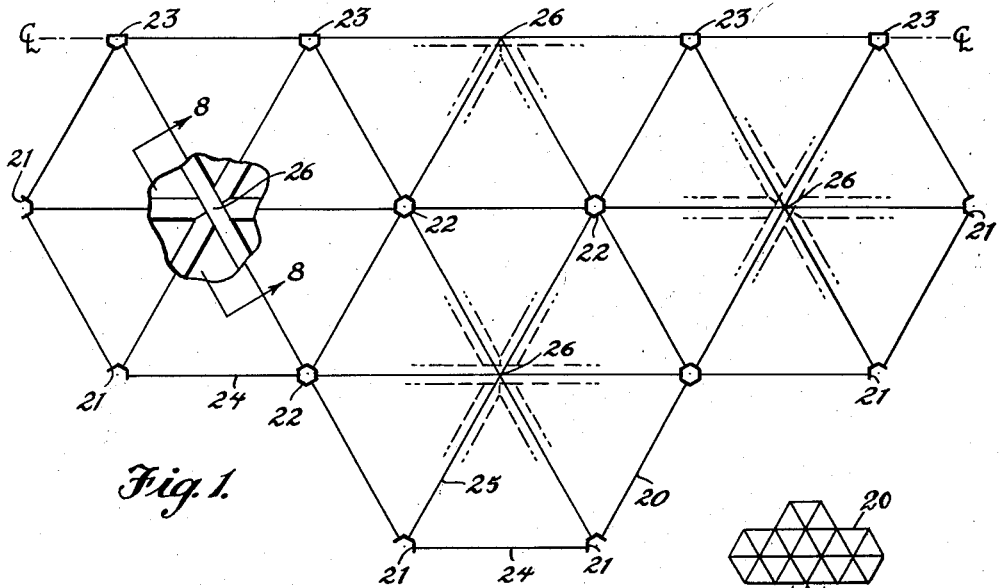
Fig. 1.
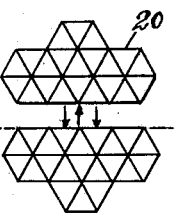
Fig. 1a.
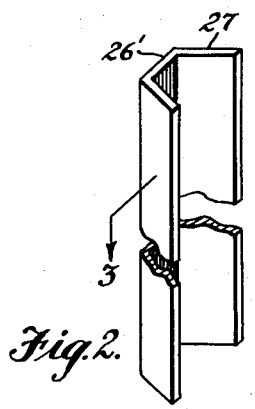
Fig. 2.    Fig. 3.
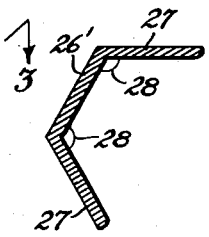
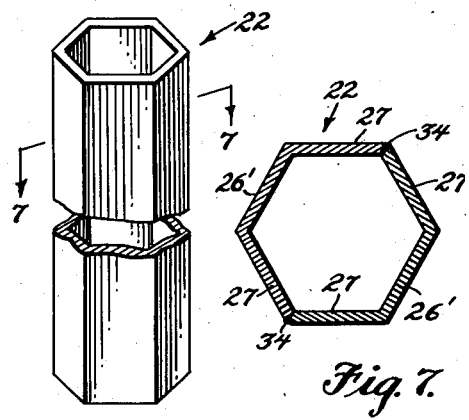
Fig. 6.    Fig. 7.
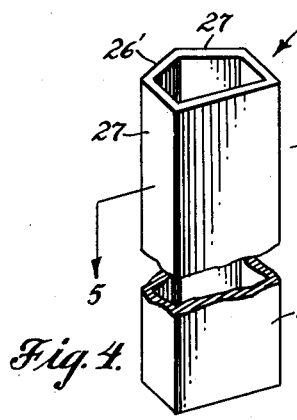
Fig. 4.    Fig. 5.
INVENTOR
Arthur F. Deam
BY
ATTORNEYS Jan. 10, 1961  A. F. DEAM  2,967,594
COLUMN AND BEAM CONNECTION
Original Filed Feb. 9, 1956  3 Sheets-Sheet 2
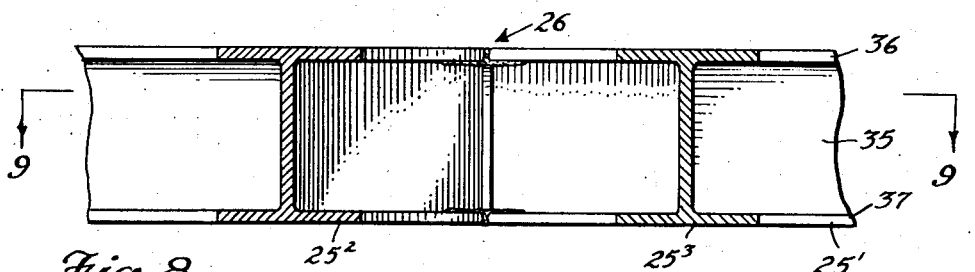
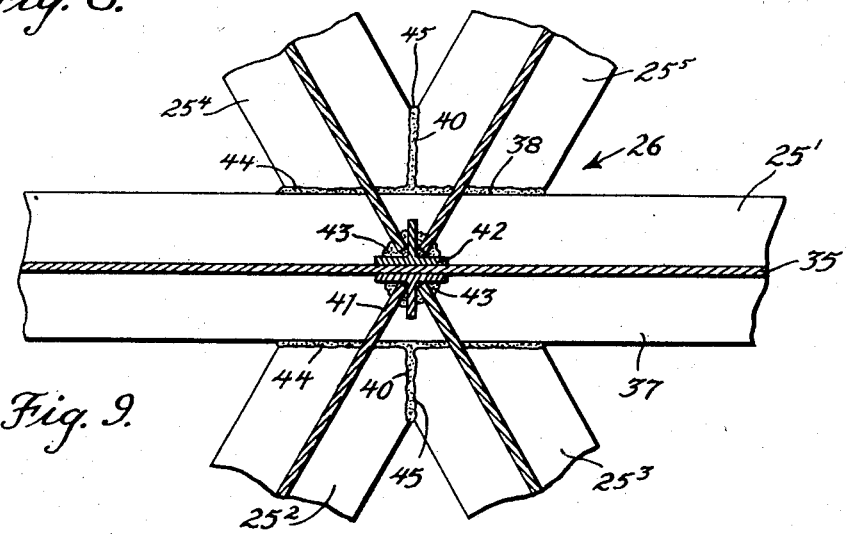
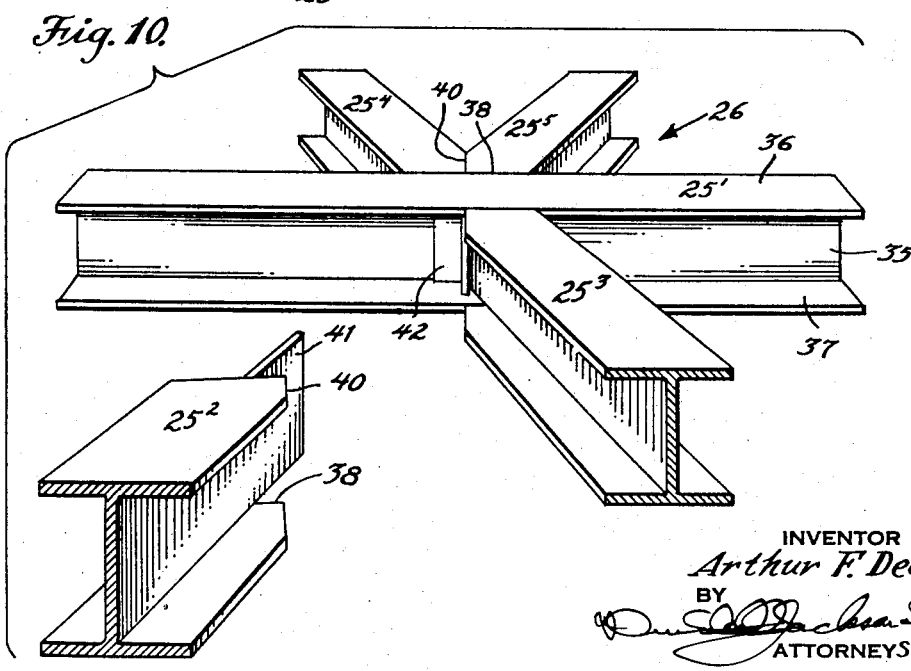
INVENTOR
Arthur F. Deam
BY
ATTORNEYS

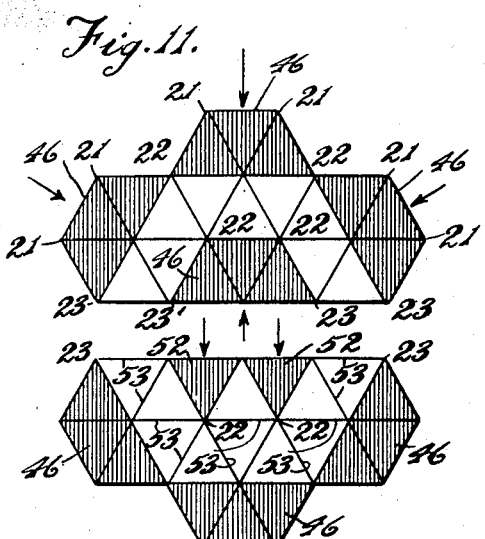
Fig.11.
Fig.11a.
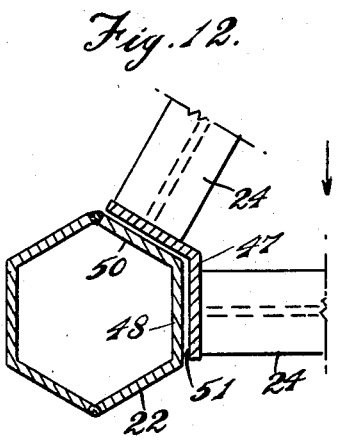
Fig.12.
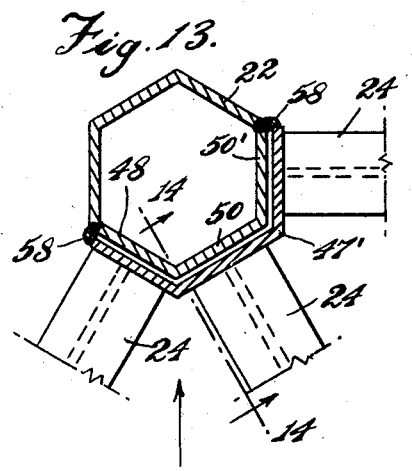
Fig.13.
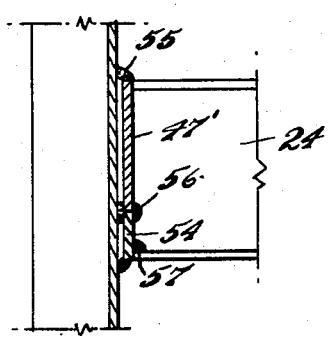
Fig.14.
INVENTOR
Arthur F. Deam
BY
ATTORNEYS

United States Patent Office 2,967,594
Patented Jan. 10, 1961

2,967,594

COLUMN AND BEAM CONNECTION

Arthur F. Deam, 209 W. Minnesota Ave., De Land, Fla.

Original application Feb. 9, 1956, Ser. No. 564,463. Divided and this application July 11, 1957, Ser. No. 671,172

1 Claim. (Cl. 189—36)

The present invention relates to polygonal structures particularly suited to schools, but useful also for other buildings such as libraries, industrial plants, public buildings, and the like.

The present application contains divisible subject matter of my copending application, Serial No. 564,463, filed February 9, 1956, for Hexagonal Structure, now Patent No. 2,959,256, dated November 8, 1960.

A purpose of the invention is to standardize on a column unit which is adapted to produce a wide variety of columns required in different parts of the polygonal structure.

A further purpose is to employ as a column unit a channel having angles between the flanges and the web of approximately 120 degrees.

A further purpose is to utilize the column unit alone as a column in a polygonal structure.

A further purpose is to place two of the column units face to face and weld them together to form a column.

A further purpose is to place one of the column units face to face with an angle and weld them together to form a column.

A further purpose is to secure beams to a polygonal column or partial polygonal column by a polygonal connector or partial polygonal connector, permitting prefabrication of the assembly of the connector and beams.

A further purpose is to support the connector on a saddle secured to the column.

Further purposes appear in the specification and in the claims.

In the drawings, I have chosen to illustrate a few only of the numerous embodiments in which my invention may appear, selecting the forms shown from the standpoints of convenience in illustration, satisfactory operation and clear demonstration of the principles involved.

Figure 1 is a partially diagrammatic top plan view of a portion of a structure according to the invention, and consisting of three and one-half hexagons which form approximately one-half of the plan.

Figure 1a is a complete plan view of the building of Figure 1, to reduced scale, separated at the center line to show the two halves.

Figure 2 is a fragmentary perspective of one of the column units of the invention.

Figure 3 is a transverse section of the column unit of Figure 2, the section being taken on the line 3—3.

Figure 4 is a fragmentary perspective of a variant form of column according to the invention, made up from one of the channel column units and an angle.

Figure 5 is a transverse section of Figure 4 on the line 5—5.

Figure 6 is a fragmentary perspective showing a column according to the invention made up of two of the column units face to face.

Figure 7 is a transverse section on the line 7—7 of Figure 6.

Figure 8 is an enlarged fragmentary vertical section of a girder joint according to the invention, the section being taken on the line 8—8 of Figure 1.

Figure 9 is a plan section on the line 9—9 of Figure 8.

Figure 10 is an exploded perspective of the grider joint of Figures 8 and 9.

Figure 11 is a diagrammatic plan view showing a variation.

Figure 11a is a view corresponding to Figure 11 showing a further variation.

Figure 12 is an enlarged fragmentary horizontal section immediately above a floor level showing the means of connecting prefabricated girder assemblies to the columns.

Figure 13 is a view similar to Figure 12 illustrating a variation in the prefabricated girder combination.

Figure 14 is a section on the line 14—14 of Figure 13.

In my copending U.S. patent application Serial No. 384,916, filed October 8, 1953, now Patent No. 2,922,299, for Building, I illustrate a building construction using hexagonal building units which is particularly suited for a school. It has been found to be difficult to attach girders to conventional columns in this structure, and I have produced improved columns and an improved girder joint which further reduce the cost of the construction, and simplify the design and the actual building of the structure.

In the preferred embodiment of the present invention, I utilize a diverging flanged channel as a column unit, employing this channel alone as a column in some cases and making up columns from two of such channels or from such a channel and an angle in other cases.

In the improved girder joint of the invention I avoid the necessity of cutting all of the girders and in many cases eliminate the need for a column at the girder joint, allowing one of the girders to extend clear across, and cutting the ends of the other girders so as to support them firmly on and interrelate them to the first girder. All of the other girders are suitably cut in the same way.

It is desirable in many instances to make up prefabricated combinations of girders and assemble them to the columns using connectors which have desirably been secured to the girders in the shop. It is also advantageous to provide for support of the direct downward load by saddles or seats which engage the connectors.

I illustrate in Figure 1 suitably in top plan view half of a hexagonal building structure 20 shown more completely in Figure 1a and having diverging flanged channels as columns at 21 suitably at the outside wall, combinations of two such column units joined together and functioning as columns at 22 where loads and locations of girders require, and combinations of one of such column units with an angle to function as a column at 23 where the loads and relations to girders permit.

Each of the columns is connected by beams, channels or angles 24 around the sides of the hexagon, and girders 25 extend radially and connect at a joint 26 at the center of each hexagonal unit.

The column unit which is used alone for the columns 21 and which is used to build more complex shapes in the columns 22 and 23 comprises a web 26' and diverging flanges 27 at the two sides. The length of the web and the length of each of the flanges in cross section is desirably made the same as shown. The angles at 28 between each flange and the web are desirably approximately 120 degrees as shown.

While the column unit may be rolled, it may also be formed by bending plate, and it is widely adaptable to various other fabricating methods. It will be evident that in any one of the positions of the column 21 or in the other columns each flange 27 and the web 26' is in right angle abutting relationship with one of the girders, so that a very simple and conventional attachment can be made, using any suitable bracket or the like, or welding if desired.

For making up the columns 23, a column unit consisting of a web 26' and flanges 27 is placed in face to face abutting relationship with an angle 30 as shown in Figures 4 and 5, the angle consisting of one flange 31 of a length corresponding to the length of one of the flanges 27, and a longer flange 32 which corresponds in length to the base of the triangle across between the web 26' and one flange 27. Welds 33 join together the outer adjoining ends of the flanges of the column unit and the angle. Here again each of the sides 31, 27, 26' and 27 is in right angle abutting relationship with one of the girders to be connected to the column.

For the columns 22 two opposed column units are placed with the ends of their flanges in engagement and their hollow sides toward one another and joined by welds 34 at the ends of the flanges. Here again each one of the sides is in right angle abutting relationship to one of the girders to be secured to the column.

In some cases it is desirable to provide a joint of the girders at 26 in the center of the hexagonal unit, where no column is used, since the structure at 26 is supported from the radial beams. This is accomplished best as shown in Figures 8 to 10. Here one girder 25' is continued uninterruptedly across the joint. It, like the other girder shown, is of I-beam construction but it can equally well be of open web joist or other metal construction. This girder has a web 35, top flanges 36 and bottom flanges 37. There are two pairs of girders which come in at 60° angles from one another on the opposite sides. In the preferred embodiment each of the girders 25², 25³, 25⁴ and 25⁵ has its top and bottom flanges cut off diagonally at 38 to abut against the outer edge of the corresponding flange of the girder 25'. All of the cuts will suitably be identical. On the side toward the opposite girder of the pair, each flange is bevelled at 40 to allow the flanges to meet. The web of the girders coming in at the 60° angles to the girder 25' is allowed to extend beyond the flanges at 41 and to rest on the bottom flange 37 of the girder 25'. Suitable T-shaped brackets 42 are desirably welded to the web of the girder 25' at a position between the ends of the extended webs 41, and welds are desirably made at 43 in the space between such brackets and the web ends 41. The T-shaped brackets are desirably used to assist in positioning the beam elements. Likewise welds 44 are made between the top flanges and between the bottom flanges of each of the girders abutting against the girder 25', and the corresponding flanges of the girder 25'. Also welds 45 are made at the bevel positions between the top flanges and between the bottom flanges of the abutting girders. In this way of fact that the girder 25' is integral strengthens the joint, and the fact that the webs of the other girders rest on the girder 25' gives them better support while the welds to the ends of the webs of the girders and to other flanges secure the structure firmly together, thereby performing the function usually contemplated in beam design, by making each of the six beams of equal structural value.

There is a great advantage in some instances in employing shop-assembled or prefabricated sub-assemblies of girders or beams. In Figure 11, I illustrate a structure similar to Figure 1, making use of prefabricated girder assemblies. The prefabricated units are shown by crosshatching.

The colums 22 in Figure 11 are desirably carried through two stories of the building, and the exterior columns 23 are carried through two stories. In the case of columns 21, a column member one story high connects to another at each floor level, and the same is true of interior columns 23.

Half hexagonal assemblies of girders as indiacted by the crosshatching at 46 are prefabricated in the shop, or assembled on the ground, and are inserted in the directions indicated by the arrows adjoining each of the units. The assembly to columns 22 is indicated in Figure 12, which shows beams, channels or angles 24, each abutting and welded to a connector 47, which is bent to conform to adjoining sides 48 and 50 of the column 22. In this case the angle between two adjoining sides on the column is 120°, and the angle between two adjoining sides on the connector is also 120°. The connector is desirably supported on a saddle as later described, and the connector is welded to the column to form top, bottom and edge seams at the space 51 in Figure 12.

In some instances, as illustrated in Figure 11a, it is preferable to use triangular prefabricated assemblies of girders 52 (see crosshatching) which are inserted in the direction of the arrows and secured to the column 22 in the manner indicated in Figure 12. Prefabricated girder structures 46 may also be used for other parts of the same structure as shown.

In this instance, the girders or beams 53 are erected on the job.

The manner of securing prefabricated girder assemblies to the interior columns 22 is indicated by Figures 13 and 14. In this case, each girder or beam 24 is secured as by welding at the ends to a connector 47', which in this case has three sides conforming to the sides 48, 50 and 50' of the column. Each of the sides of the column makes an angle of 120° with the adjoining side (the angles conform to Figure 12), and similar angles are made by the sides of the connector.

The connector, as shown in Figure 14 is desirably shorter in depth than the girder or beam, and a saddle or seat 54 is prefastened as by welding to the column and extends around and against the three sides of the column in the same manner as the connector. In assembly, the prefabricated girder unit is supported by resting the connector 47' on the saddle 54 and then the structure is assembled by welding the connector to the column at 55, welding the connector to the saddle at 56 and welding the saddle to the girders at 57. It will be evident that welds will be made around the edges of the connector at 58.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention, what I claim as new and desire to secure by Letters Patent is:

In a building structure, a column having at least three adjoining straight sides of generally equal width, each of which sides is disposed to the next side at a cross-sectional angle of substantially 120°, a connector having three adjoining straight sides of generally equal width which are disposed to one another at angles of substantially 120°, each of the sides of the connector resting against one of said adjoining straight sides of the column, three girders, one abutting against each one of the sides of the connector and secured to said connector, and a saddle having at least three adjoining straight sides disposed to one another at substantially 120° angles, each of the straight sides of the saddle resting against one of said straight sides of the column and the saddle being secured to the column beneath the connector, and the connector resting endwise on the saddle and said saddle supporting the combination of the connector and the girders.

References Cited in the file of this patent

UNITED STATES PATENTS

| | | |
|---|---|---|
| 96,357 | Smith | Nov. 2, 1869 |
| 626,365 | Calvert | June 6, 1899 |
| 2,439,129 | Donahue et al. | Apr. 6, 1948 |
| 2,574,241 | Bobst | Nov. 6, 1951 |